United States Patent [19]
Tanoue

[11] Patent Number: 5,719,693
[45] Date of Patent: Feb. 17, 1998

[54] POWER FEEDING SYSTEM FOR AN OPTICAL TRANSMISSION SYSTEM

[75] Inventor: Toshiyuki Tanoue, Kawasaki, Japan

[73] Assignee: Fujitsu Limited, Kawasaki, Japan

[21] Appl. No.: 266,304

[22] Filed: Jun. 27, 1994

Related U.S. Application Data

[63] Continuation of Ser. No. 809,115, Dec. 18, 1991, abandoned.

[30] Foreign Application Priority Data

Dec. 18, 1990 [JP] Japan ................................. 2-411546

[51] Int. Cl.$^6$ ........................................................ H04B 10/02
[52] U.S. Cl. ............................. 359/174; 359/171; 359/176
[58] Field of Search ............................... 359/141, 152, 359/160, 173, 171, 174, 175, 176, 154; 250/551; 385/24, 101; 340/475, 291; 375/3, 3.1

[56] References Cited

U.S. PATENT DOCUMENTS

| | | | |
|---|---|---|---|
| 3,943,358 | 3/1976 | Reymond et al. | 359/179 |
| 4,313,224 | 1/1982 | Wakabayashi et al. | 359/177 |
| 4,641,372 | 2/1987 | Kelly et al. | 359/171 |
| 4,879,762 | 11/1989 | Hanyuda et al. | 359/141 |
| 4,995,100 | 2/1991 | Stallard et al. | 359/187 |
| 5,054,876 | 10/1991 | Grasso et al. | 385/24 |

FOREIGN PATENT DOCUMENTS

| | | | |
|---|---|---|---|
| 57-058420 | 7/1982 | Japan | H04B 3/44 |
| 57-099042 | 9/1982 | Japan | H04B 3/50 |
| 58-036033 | 5/1983 | Japan | H04B 3/14 |
| 0249444 | 12/1985 | Japan | 359/176 |
| 0252725 | 11/1986 | Japan | 359/141 |
| 62-123842 | 6/1987 | Japan | H04B 9/00 |
| 0098231 | 4/1988 | Japan | 359/176 |

OTHER PUBLICATIONS

Thiennot et al., "Optical Undersea Systems in France—Today and Tomorrow," *IEEE Communications Magazine*, vol. 23, No. 8, Aug. 1985, pp. 6–14.

Nishikawa et al., "Power Feed Equipment for a Transoceanic Optical Fiber Submarine Cable System, "9th *International Telecommunications Energy Conference*, INTELEC 87 No. 14–6, Jun. 1987, pp. 607–611.

Calvo et al., "Power Feed Equipment for the SL Undersea Lightwave Cable," 10th *International Telecommunications Energy Conference*, INTELEC 88, No. 7–12, Oct. 1988, pp. 194–200.

Thiennot et al, "Optical Undersea systems in France—Today and Tomorrow.", IEEE 1985 pp. 6–13.

Calvo, et al., "Power Feed Equipment for the SL Undersea Light–wave Cable", 10th *International Telecommunications Energy Conference*, INTELEC 88, pp. 194–200, Oct., No. 7–12, 1988.

Nishikawa et al., "Power Feed Equipment for a Transoceanic Optical Fiber Submarine Cable System", 9th *International Telecommunications Energy Conference*, INTELEC 87, pp. 607–611, Jun. No. 14–36, 1987.

*Primary Examiner*—Wellington Chin
*Assistant Examiner*—Rafael Bacares
*Attorney, Agent, or Firm*—Staas & Halsey

[57] ABSTRACT

In a power feeding system for an optical transmission system used as an optical submarine cable system formed by at least two cable landing stations, a power feeding cable is provided between the cable landing stations, and a plurality of optical repeaters are provided at predetermined intervals on the optical submarine cable. The power feeding system includes at least one constant voltage source provided for one end or both ends of the power feeding cable to apply an electric potential between the power feeding cable and the ground, and another constant voltage source provided in the cable landing station. In addition, the power feeding system includes an optical repeater connected between the power feeding cable and the ground to utilize the electric potential as a supply voltage for the optical repeater itself.

11 Claims, 9 Drawing Sheets

Fig. 8

| REPEATER NUMBER | DISTANCE FROM CENTER (Km) | PRIOR ART VOLTAGE (V) | PRESENT INVENTION VOLTAGE (V) | PRESENT INVENTION CURRENT (A) |
|---|---|---|---|---|
| 1 | 70.00 | 119.60 | 1450.00 | 0.000 |
| 2 | 210.00 | 328.80 | 1453.71 | 0.033 |
| 3 | 350.00 | 538.00 | 1461.11 | 0.066 |
| 4 | 490.00 | 747.20 | 1472.20 | 0.099 |
| 5 | 630.00 | 956.40 | 1486.94 | 0.132 |
| 6 | 770.00 | 1165.60 | 1505.29 | 0.164 |
| 7 | 910.00 | 1374.80 | 1527.21 | 0.196 |
| 8 | 1050.00 | 1584.00 | 1552.65 | 0.227 |
| 9 | 1190.00 | 1793.20 | 1581.56 | 0.258 |
| 10 | 1330.00 | 2002.40 | 1613.87 | 0.288 |
| 20 | 2730.00 | 4094.40 | 2107.56 | 0.555 |
| 30 | 4130.00 | 6186.40 | 2857.46 | 0.754 |
| 40 | 4970.00 | 7441.60 | 3401.95 | 0.848 |

POWER FEEDING SYSTEM FOR AN OPTICAL TRANSMISSION SYSTEM

This application is a continuation of application Ser. No. 07/809,115, filed Dec. 18, 1991 now abandoned.

BACKGROUND OF THE INVENTION

1. Field of the Invention

The present invention relates to a power feeding system for an optical transmission system. The present invention is advantageously used for an optical submarine cable system.

2. Description of the Related Art

An optical transmission system using an optical fiber cable is widely utilized in a data transmission system. Recently, optical fiber cables have been used for optical submarine cable systems because they enable high speed transmission and extensive data transmission. The submarine cable system is formed by the optical fiber cable and the power feeding cable coaxially provided around the optical fiber cable. Further, a plurality of optical repeaters are provided for every predetermined interval (distance) on the optical submarine cable to amplify transmitting signals. As is obvious, the optical fiber cable is used for transmitting data, and the power feeding cable is used for supplying the power to the optical repeaters.

In a conventional art, it is necessary to supply a very high system voltage to both cable landing stations (i.e., transmitting/receiving stations provided for both coasts) and to flow the current through the power feeding cable. Accordingly, the system voltage and the current must be improved to reduce the power consumption as explained below. The present invention relates to an improvement of the power feeding system for the optical transmission system, particularly, for the optical submarine cable system.

SUMMARY OF THE INVENTION

The object of the present invention is to provide an improved power feeding system for an optical transmission system, enabling reduction of the power consumption in the power feeding cable and enabling reduction of the system voltage in the cable landing stations, and further enabling the transmission of a large power supply to the optical repeaters.

In accordance with the present invention, there is provided a power feeding system for an optical transmission system used as an optical submarine cable system formed by at least two cable landing stations, a power feeding cable provided between the cable landing stations, and a plurality of optical repeaters each provided at predetermined intervals on the optical submarine cable; the power feeding system includes:

at least one constant voltage source provided for one end or both ends of the power feeding cable to apply an electric potential between the power feeding cable and the ground, and a constant voltage source provided in the cable landing station; and each optical repeater connected between the power feeding cable and the ground to utilize the electric potential as the supply voltage for the optical repeater itself.

In the preferred embodiment, the power feeding cable is set to a negative potential, and the ground is set to a positive potential in the constant voltage source.

In the preferred embodiment, the body or structure of the optical repeater is used as the ground.

In the preferred embodiment, the optical repeater has two breakers connected in series to the power feeding cable, and a repeater circuit connected between a common connection point of two breakers and the ground.

In the preferred embodiment, the optical repeater further has a capacitor connected between the common connection point and the ground for storing charges of the power feeding cable.

In the preferred embodiment, in the case of two constant voltage sources provided for both ends of the power feeding cable, when one breaker of the power feeding cable is disconnected accidentally so that one constant voltage source is also disconnected from the repeater circuit, the electric potential is applied from the other constant voltage source to the repeater circuit through another breaker.

In the preferred embodiment, the power feeding system further comprises a branching unit for collectively connecting a plurality of power feeding cables.

BRIEF DESCRIPTION OF THE DRAWINGS

In the drawings:

FIG. 8 is a table for explaining detailed electric potential values shown in FIGS. 6 and 7.

DESCRIPTION OF THE PREFERRED EMBODIMENTS

Before describing the preferred embodiments, an explanation will be given of a conventional power feeding system in the prior art.

Figure 1:
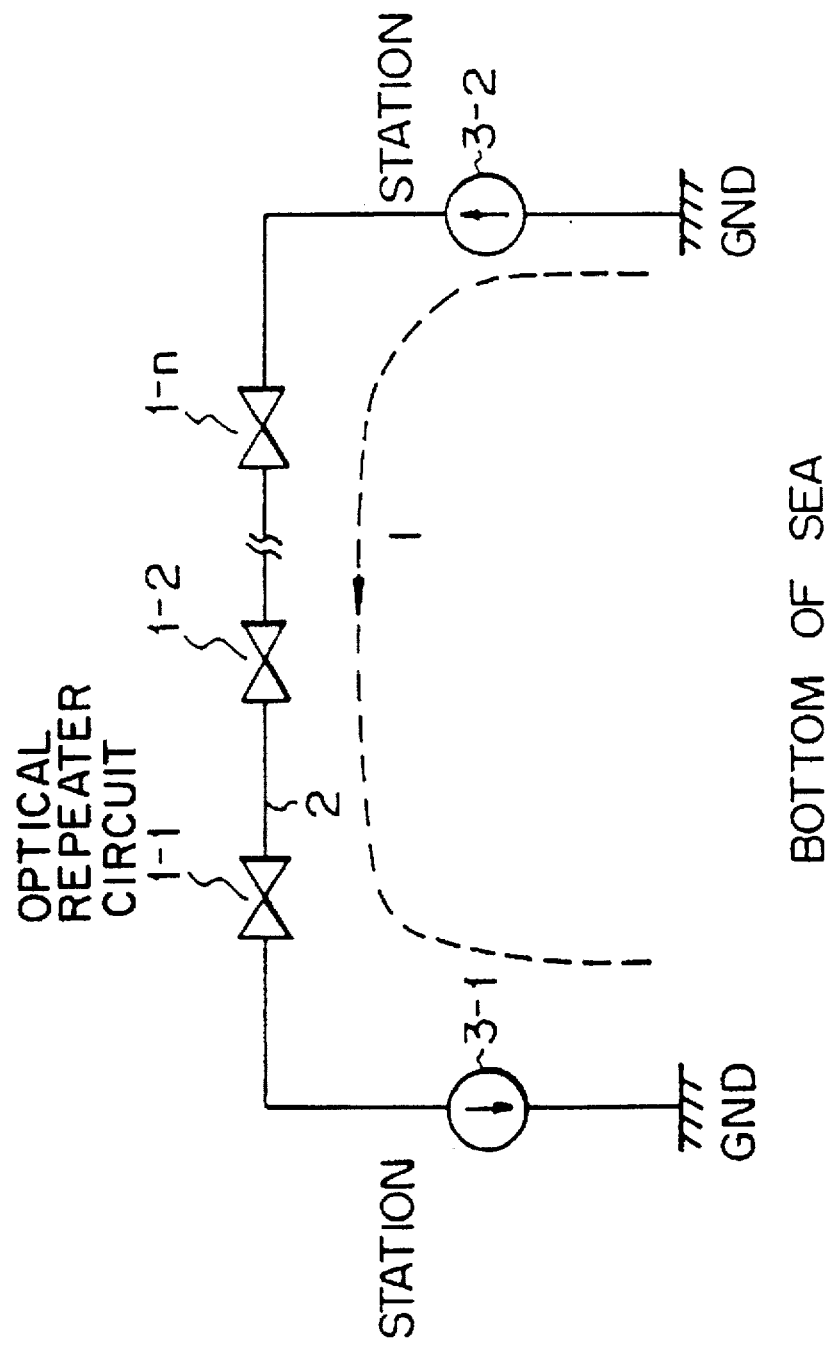
FIG. 1 is a schematic block diagram of a conventional power feeding system in an optical submarine cable system.

FIG. 1 is a schematic block diagram of a conventional power feeding system in an optical submarine cable system using the optical fiber cable and the power feeding cable. In FIG. 1, reference numbers 1-1 to 1-n denote optical repeaters, 2 denotes a power feeding cable, and 3-1 and 3-2 denote cable landing stations provided as the constant current sources. Further, GND denotes the ground.

As shown in the drawing, all optical repeaters 1-1 to 1-n are connected in series between constant current sources 3-1 and 3-2 through the power feeding cable 2, and used for amplifying signals transmitted through the optical fiber cable which is coaxially provided in the power feeding cable 2. Further, the constant current sources 3-1 and 3-2 are used for supplying a constant current I to the optical repeaters 1-1 to 1-n through the power feeding cable 2.

As shown by arrow, the constant current I flows, for example, from the constant current source 3-2 to the constant current source 3-1 through the optical repeaters 1-1 to 1-n, and returns from the constant current source 3-1 to the constant current source 3-2 through the ground GND (i.e., sea water)

Figure 2:
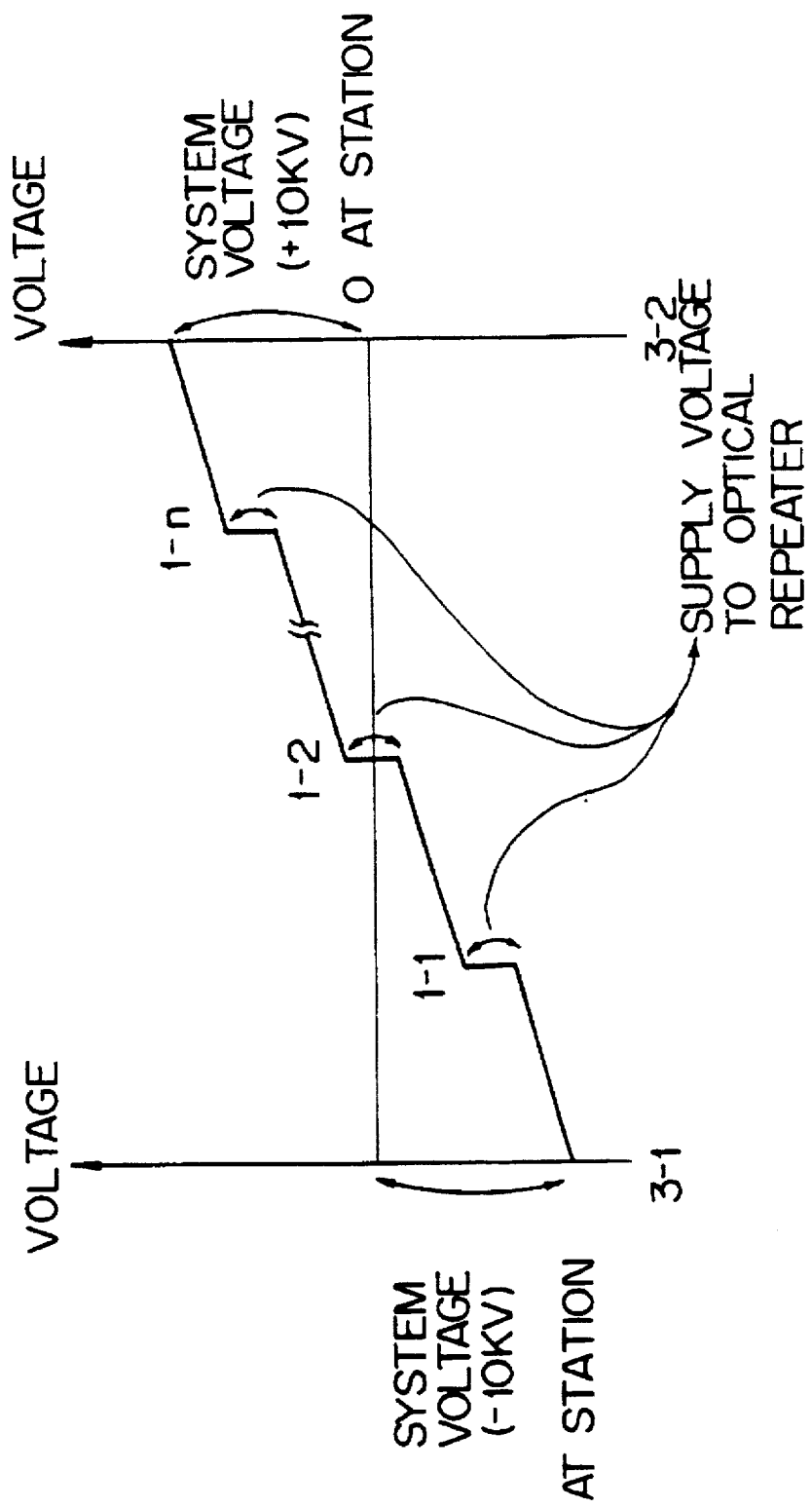
FIG. 2 is a view for explaining voltage drops in a power feeding cable and optical repeaters shown in FIG. 1.

FIG. 2 is a view for explaining voltage drop in the power feeding cable 2 and the optical repeaters 1-1 to 1-n in FIG. 1. As shown in the graph, since the constant current I flows through the power feeding cable 2, the supply voltage at the constant current source 3-2 is gradually dropped by the resistance component of the power feeding cable 2 itself and the optical repeaters 1-1 to 1-n. In this case, the voltage drop in each of optical repeaters 1-1 to 1-n is utilized as the supply voltage to the optical repeater itself. That is, each of optical repeaters 1-1 to 1-n has, for example, a zener diode (not shown) to obtain the voltage drop. Accordingly, the necessary supply voltage for operating the optical repeater 1-1 to 1-n itself can be obtained by the voltage drop across the zener diode.

There are, however, the following problems in the above conventional power feeding system.

In general, it is necessary to supply a large power to the optical repeaters for the optical transmission system in comparison with the repeater for the coaxial transmission system. This is because the transmission speed at the optical transmission system is considerably faster than that of the coaxial transmission system so that it is necessary to provide a large amplification rate of the transmission signal in the optical repeater. In this case, the faster the transmission speed is, the larger the power consumption is. Accordingly, it is necessary to supply a larger current to the power feeding cable 2 to obtain a large supply voltage in the optical repeaters.

In this case, when a large current flows through the power feeding cable 2, the large power is consumed as heat in the power feeding cable 2 in proportion to the power of the current. In the conventional art shown in FIG. 1, five to ten times of the power is consumed as heat in the power feeding cable 2 as compared with the power consumption in one optical repeater. For example, in the case of the optical submarine cable system directly traversing the Pacific Ocean, it is necessary to supply a large system voltage, for example, ±10 KV, to the constant current source 3-1 and 3-2 to obtain a sufficient supply voltage in each of optical repeater circuits 1-1 to 1-n, and the current of 1.6 to 2.0 (A) must flow in the power feeding cable. Accordingly, it is necessary to reduce the current flowing in the power feeding cable and the supply voltage at the cable landing station.

Therefore, the object of the present invention lies in the reduction of the power consumption in the power feeding cable and the system voltage at the cable landing stations, and in the reduction of the supply of a large power source to the optical repeater.

Figure 3:
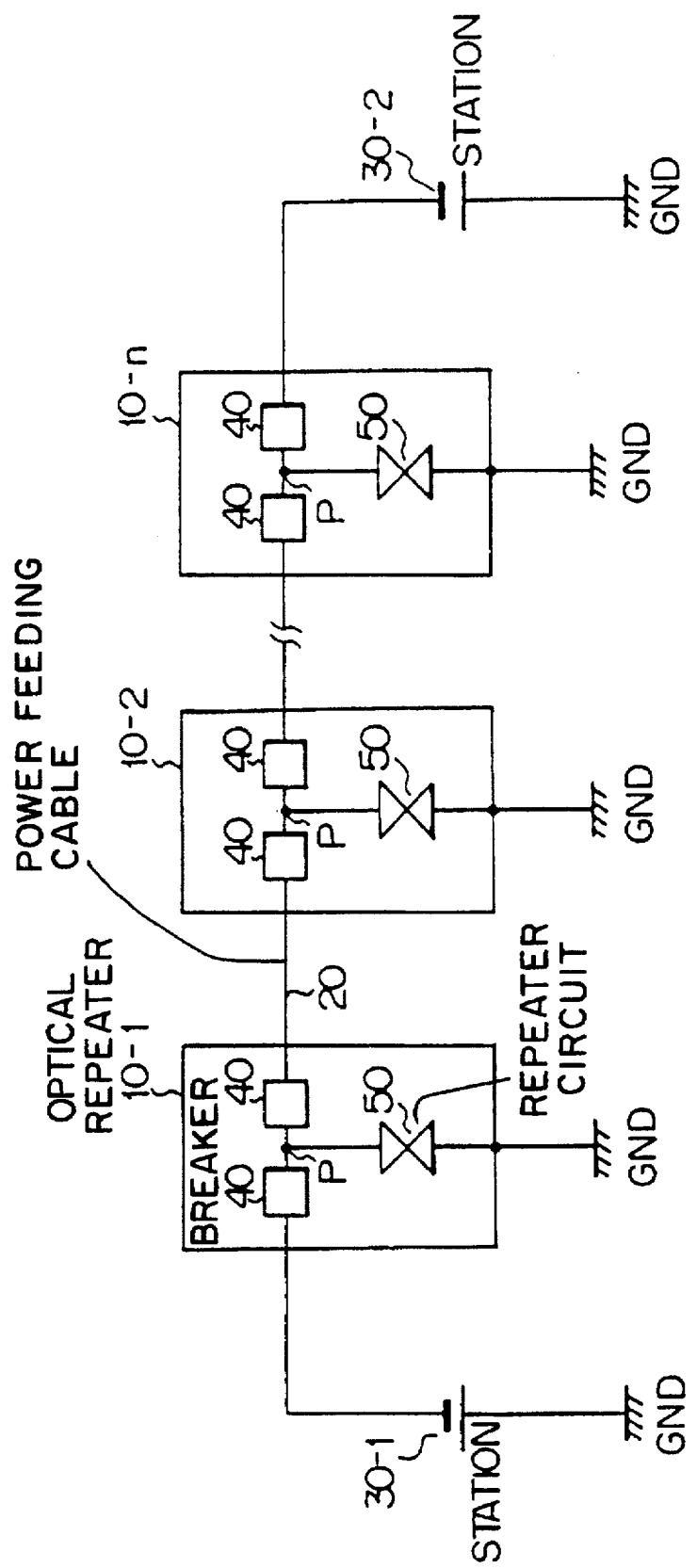
FIG. 3 is a schematic block diagram of a power feeding system according to the present invention.

FIG. 3 is a schematic block diagram of a power feeding system according to the present invention. In FIG. 3, reference numbers 10-1 to 10-n denote optical repeaters, reference number 20 denotes the power feeding cable, and 30-1 and 30-2 denote cable landing stations as the constant voltage sources. Further, each optical repeater 10-1 to 10-n has two breakers 40 for disconnecting the power feeding cable 20, and a repeater circuit block 50 for amplifying the transmission signals. The breakers 40 are connected in series to the power feeding cable 20, and electrically disconnected from the power feeding cable 20 when an accident occurs in the power feeding cable 20. That is, when the power feeding cable is accidentally cut-off, a short-circuit is formed between the power feeding cable and the ground (i.e., sea water). Accordingly, a very large current suddenly flows to the breaker 40 and the breaker 40 detects the current so that the optical repeater is disconnected from the power feeding cable. However, in the present invention, even if the power feeding cable is disconnected by one of two breakers, the optical repeater can operate normally as explained below.

As shown in the drawing, each repeater circuit block 50 is connected between the power feeding cable 20 and the ground GND. In detail, the repeater circuit 50 is connected between the common connection point P of the breakers 40 and the ground GND. In this case, preferably, the body of the optical repeater 10 itself is provided as the ground GND. The constant voltage sources 30-1 and 30-2 are also connected between the power feeding cable 20 and the ground GND to supply the electric potential therebetween. In this case, preferrably, the power feeding cable 20 is set to a negative potential, and the ground GND is set to a positive potential. This direction of the electric potential is advantageous for preventing the body of the optical repeater form corrosion caused by sea water. That is, in the present invention, since the ground GND is set to a positive potential, the current flows from the ground GND to the optical repeater 10 so that it is possible to prevent the body of the optical repeater from corrosion.

Figure 4:
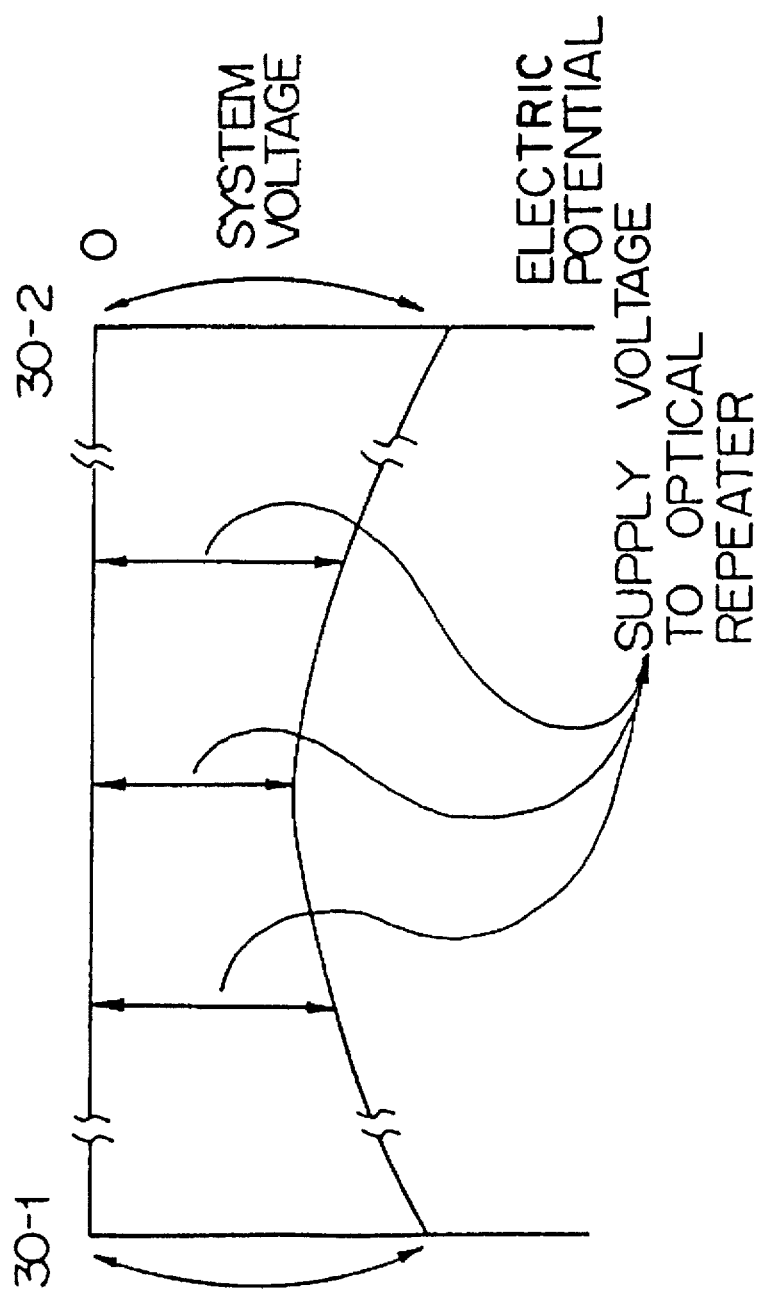
FIG. 4 is a view for explaining an electric potential in each optical repeater according to the present invention.

FIG. 4 is a view for explaining the electric potential in each of optical repeaters 10-1 to 10-n. According to the present invention, since the electric potential is utilized as the supply voltage in the optical repeater, it is possible to reduce considerably the current flowing through the power feeding cable 20 compared with the prior art shown in FIG. 1. As a result, the power consumed as heat can be reduced considerably so that it is possible to reduce considerably the system voltage as explained in detail below.

Further, since the constant voltage sources 30-1 and 30-2 are provided for both ends of the power feeding cable 20, and since two breakers are connected in series to the power feeding cable 20 and the voltage is supplied from the common point P to the repeater circuit block 50, it is possible to supply the voltage to the repeater circuit block even if one of the breakers 40 is accidentally disconnected.

Figure 5:
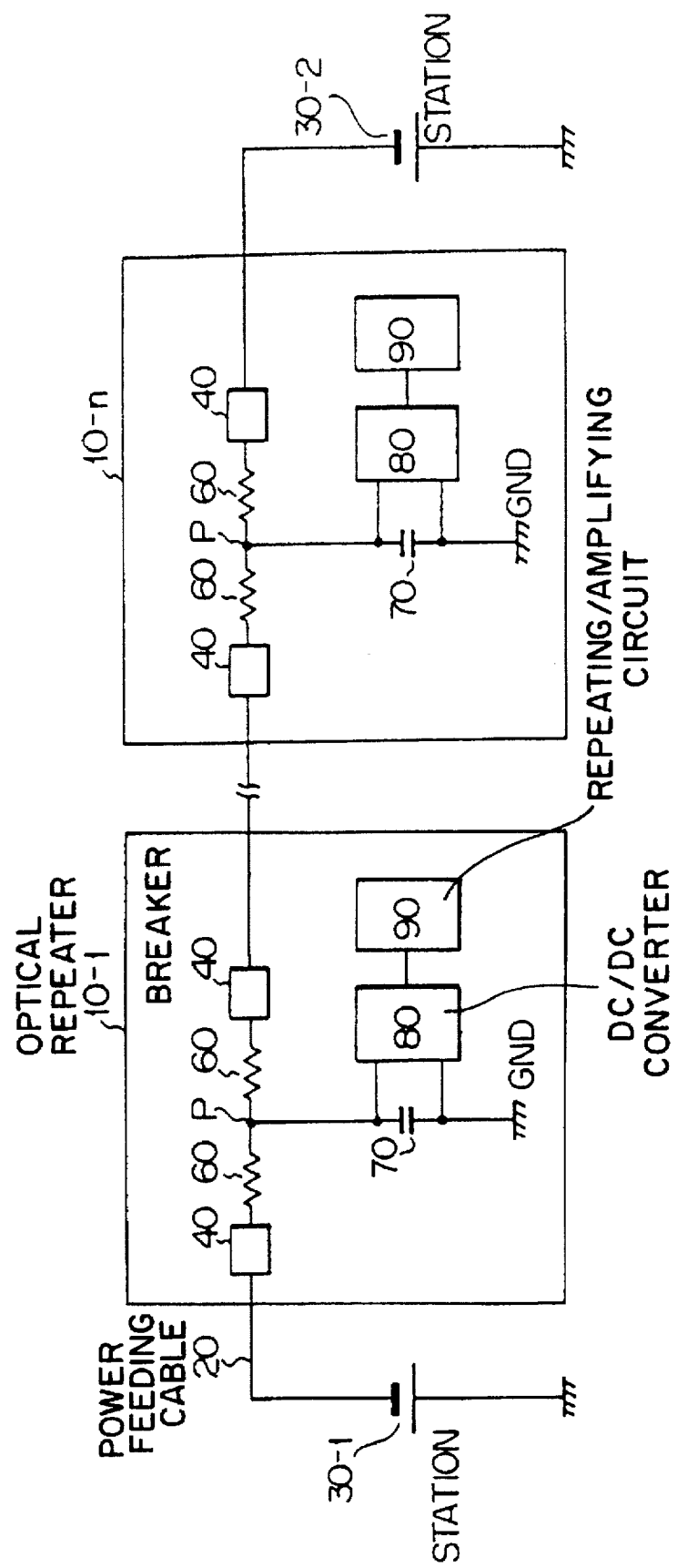
FIG. 5 is a detailed block diagram of the power feeding system according to an embodiment of the present invention.

FIG. 5 is a detailed block diagram of the power feeding system according to an embodiment of the present invention. In FIG. 5, reference number 60 is a resistor connected in series to the breaker 40 (i.e., connected in series to the power feeding cable). Reference number 70 is a capacitor connected in series between the common connection point P and the ground GND. The capacitor 70 is provided for storing charges of the power feeding cable 20. Reference number 80 denotes a DC/DC converter for converting the voltage across the capacitor 70 to a predetermined DC voltage. The constant DC voltage used as the supply voltage is adjusted by the DC/DC converter. Reference number 90 denotes a repeating/amplifying circuit. The repeater circuit block 50 in FIG. 3 comprises the capacitor 70, the DC/DC converter 80 and the repeating/amplifying circuit 90.

Figure 6:
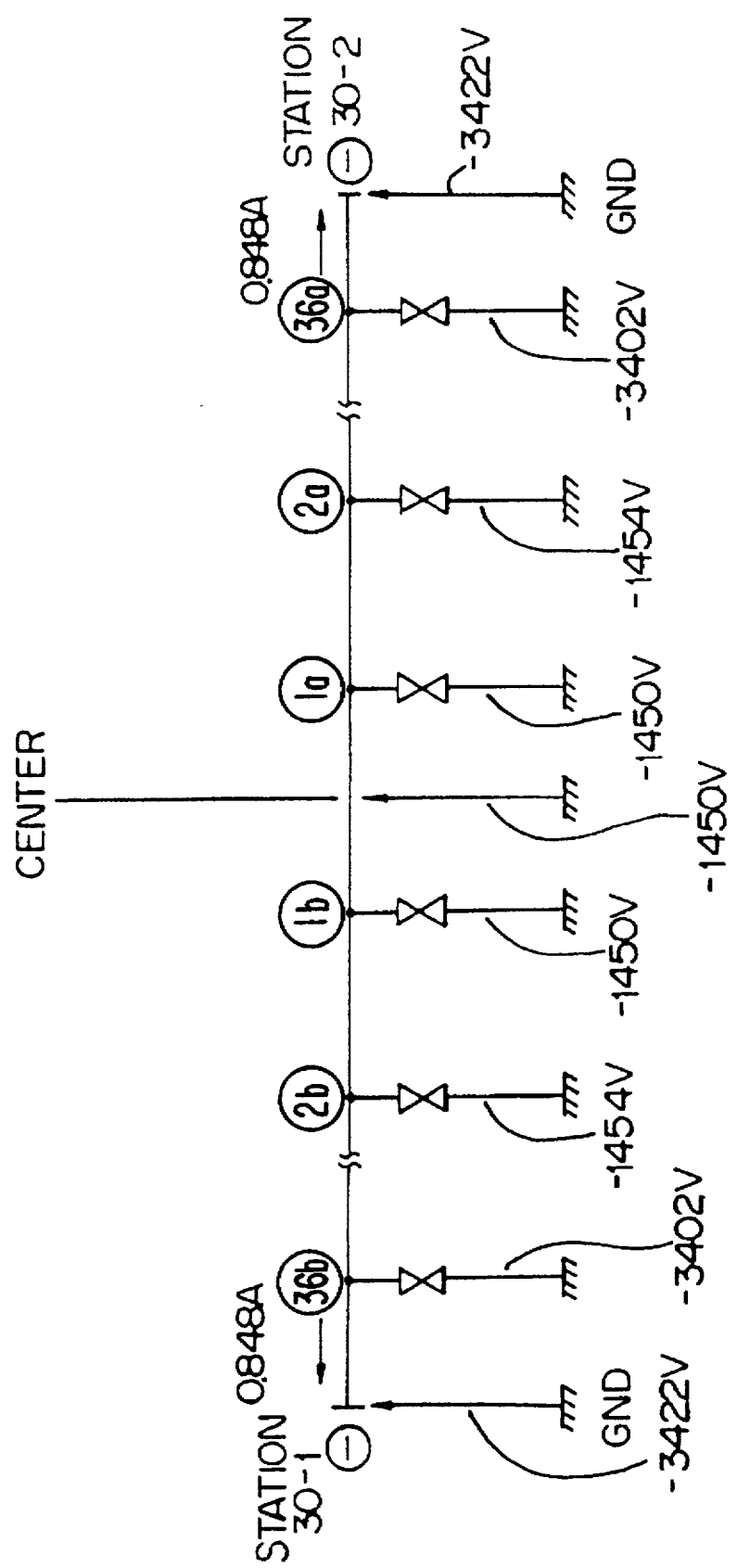
FIG. 6 is a view for explaining an electric potential in each optical repeater according to the present invention.
Figure 7:
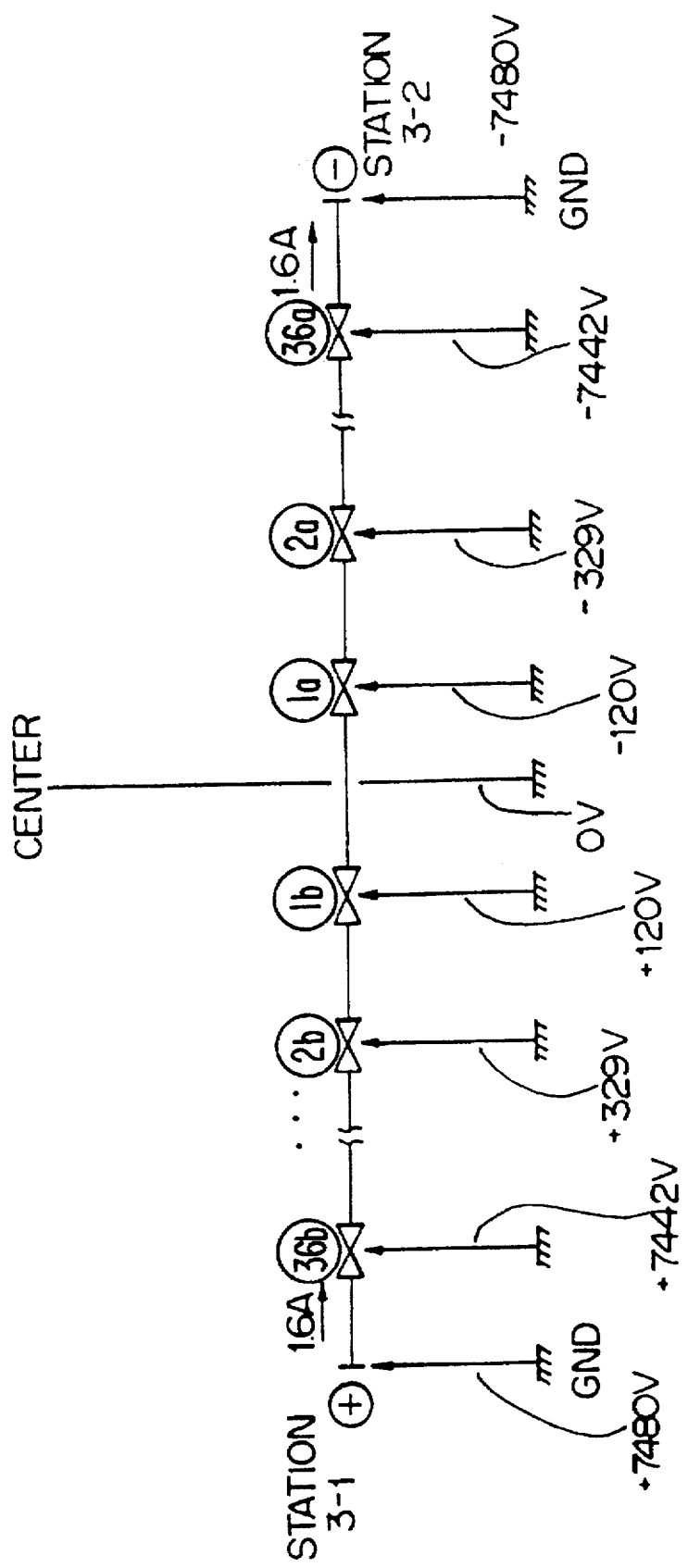
FIG. 7 is a view for explaining the electric potential in each optical repeater in the conventional art shown in FIG. 1.

FIG. 6 is a view for explaining the electric potential in each of optical repeaters according to the present invention, FIG. 7 is a view for explaining the electric potential in each optical repeater in the conventional art shown in FIG. 1, and FIG. 8 is a table for explaining detailed electric potential values shown in FIGS. 6 and 7. Both data are provided by simulation using a computer and for explaining the advantageous effects of the present invention.

In FIGS. 6 and 7, reference numbers 1a to 36a and 1b to 36b denote optical repeaters. That is, seventy-two optical repeaters (thirty-six plus thirty-six) are symmetrically provided on both sides of the center line. In this case, the data are given as follows. That is, the length of the optical submarine cable 20 is 10000 Km, each distance between optical repeaters is 140 Km, the resistance of the power feeding cable is 0.8 Ω/Km, and the power consumption of the optical repeater is 48 Watt.

As is obvious from the simulation data shown in FIG. 6, the system voltage at the cable landing station is −3.5 Kv as the maximum value, and the current flowing in the power feeding cable is 0.848 A (ampere) as the maximum value according to the present invention. In this case, the current flowing to the power feeding cable just before the optical repeater 1 is given by 0 A, the current flowing to the optical repeater 1 is given by 0.033 A, the current flowing from the repeater 1 to the repeater 2 is also given by 0.033 A, and the current flowing from the repeater 2 to the repeater 3 is given by 0.066 A by adding 0.033 A and 0.033 A. Similarly, the current flowing from the repeaters 36a and 36b to the respective cable landing station 30-1 and 30-2 is given by approximately 0.848 A by adding all currents flowing through all repeaters 1a to 35a and 1b to 35b provided before the repeater 36a and 36b.

Meanwhile, as is obvious from the simulation data shown in FIG. 7, the supply voltage at the cable landing station is ±7.5 Kv as the maximum value, and the current flowing in the power cable is 1.6 A as the maximum value. In this case, the current flowing in all repeaters and the power feeding cable is given by the constant value, i.e., approximately 1.6 A. Accordingly, these values of the supply voltage and the current according to the present invention are very small compared with the prior art values. The detailed data of the voltage and the current are shown by the table in FIG. 8.

Figure 9:
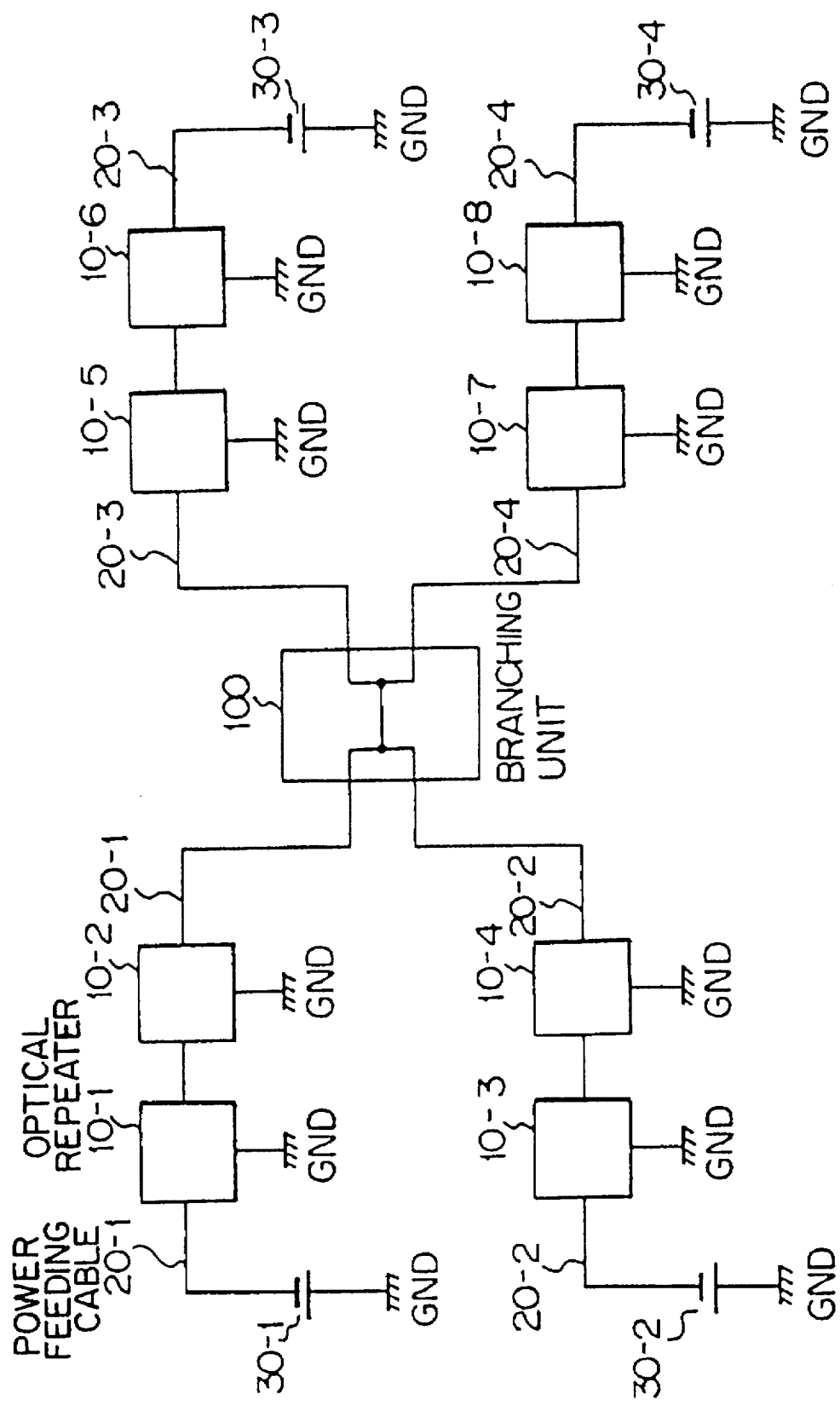
FIG. 9 is a schematic block diagram of the power feeding system according to another embodiment of the present invention.

FIG. 9 is a schematic block diagram of the power feeding system according to another embodiment of the present invention. In FIG. 9, four cable landing stations 30-1 to 30-4 are separately provided on the coast or/and. Reference number 100 denotes a branching unit for collectively connecting among the four power feeding cables. The branching unit 100 according to the present invention has a very simplified structure as shown in the drawing. That is, the branching unit 100 is used only for collectively connecting among the four power feeding cables 20-1 to 20-4 because the four power feeding cables 20-1 to 20-4 are only provided to apply the electric potential to the optical repeaters as explained above.

Further, this branching unit is advantageous in the event of an accident, even if one of the power feeding cables, for example, the power feeding cable 20-4, is accidentally cut off in the vicinity of the branching unit 100. That is, when the power feeding cable 20-4 is cut off, the change of the electric potential in the other power feeding cables 20-1 to 20-3 is negligibly small because the power feeding cables are only provided to apply the electric potential.

Accordingly, in the present invention, it is possible to have a very simplified structure with high reliability compared with the conventional branching unit (not shown) that has many relays for switching among the power feeding cables. That is, in the conventional branching unit, since a large current flows in the power feeding cable, when the power feeding cable is accidentally cut off, it is necessary to provide the balance of the current among the power feeding cables. Accordingly, as mentioned above, it is necessary to provide many relays for switching among the power feeding cables in the branching unit. Further, in the conventional branching unit, it is necessary to transmit many control signals from the cable landing station to the branching unit to switch various relay circuits.

I claim:

1. A power feeding system for an optical transmission system used as an optical submarine cable system including at least two cable landing stations and a power feeding cable having first and second ends coupled between the at least two cable landing stations, said power feeding system comprising:

a first constant voltage source included within one of the at least two cable landing stations, coupled to the first end of the power feeding cable and applying a first electric potential between the power feeding cable and ground;

a second constant voltage source included within another of the at least two cable landing stations, coupled to the second end of the power feeding cable and applying a second electric potential between the power feeding cable and ground, wherein power feeding from both ends is being performed based on the same polarity; and a plurality of optical repeaters, each of the plurality of optical repeaters being connected between the power feeding cable and the ground to utilize at least one of the first and second electric potentials as a supply voltage, one of the plurality of optical repeaters comprising two breakers having a common connection point and connected in series to the power feeding cable, and a repeater circuit connected to the common connection point of the two breakers and the ground.

2. A power feeding system as claimed in claim 1, wherein, in the first constant voltage source, the power feeding cable is set to a negative potential, and the ground is set to a more positive potential relative to the negative potential.

3. A power feeding system as claimed in claim 1, wherein one of the plurality of optical repeaters includes a body and said body is used to connect said one of the plurality of optical repeaters to the ground.

4. A power feeding system as claimed in claim 1,
wherein said power feeding cable includes charges, and
wherein said one of the plurality of optical repeaters further comprises a capacitor connected to the common connection point and the ground and storing the charges of the power feeding cable.

5. A power feeding system as claimed in claim 1, wherein when the power feeding cable is disconnected by one of the two breakers disconnecting one of said first and second constant voltage sources from the optical repeater circuit, the electric potential is applied from another of the first and second constant voltage sources to the optical repeater circuit through another of the two breakers.

6. A power feeding system as claimed in claim 1, further comprising a branching unit connected to the power feeding cable and collectively connecting the power feeding cable of the power feeding system to another power feeding cable of another power feeding system.

7. A power feeding system as recited in claim 1, wherein the ground is a potential of seawater in which the power feeding cable is submerged.

8. A power feeding system for feeding power through a power cable having first and second ends, comprising:

a first constant voltage source connected between the first end of the power cable and ground, wherein power feeding from both ends is being performed based on the same polarity;

a second constant voltage source connected to the second end of the power cable and ground;

at least one optical repeater connected to a point of the power cable between the first and second constant voltage sources, and ground;

a first breaker coupled between the first end of the power cable and the point of the power cable; and a second breaker coupled between the second end of the power cable and the point of the power cable.

9. A power feeding system as claimed in claim 8, wherein the first and second constant voltage sources generate and supply a negative potential relative to the ground, to the at least one optical repeater via the power cable.

10. A power feeding system as recited in claim 8, wherein the ground is a voltage potential of sea water in which the power cable is submerged.

11. A power feeding system as recited in claim 9, wherein the ground is a voltage potential of sea water in which the power cable is submerged.

* * * * *